United States Patent [19]
Finzel et al.

[11] Patent Number: 5,655,044
[45] Date of Patent: Aug. 5, 1997

[54] CASSETTE MODULE HAVING SWINGABLE CASSETTES AND A BACKPLANE WITH GUIDE RIDGES FOR GUIDING LIGHT WAVEGUIDES AND OPTICAL FIBERS

[75] Inventors: Lothar Finzel, Unterschleissheim; Dieter Kreutz, Gruenwald; Anton-Guenther Licker; Hermann Schmallegger, both of Munich; Guenter Schroeder, Esting, all of Germany

[73] Assignee: Siemens Aktiengesellschaft, Munich, Germany

[21] Appl. No.: 561,696

[22] Filed: Nov. 22, 1995

[30] Foreign Application Priority Data

Dec. 1, 1994 [DE] Germany .............. 44 42 823.5

[51] Int. Cl.⁶ .................................. G02B 6/36
[52] U.S. Cl. .................................. 385/135
[58] Field of Search ........................ 385/134, 135, 385/147

[56] References Cited

U.S. PATENT DOCUMENTS

| | | | |
|---|---|---|---|
| 4,898,448 | 2/1990 | Cooper | 385/135 X |
| 5,131,066 | 7/1992 | Foss | 385/135 |
| 5,323,478 | 6/1994 | Milanowski et al. | 385/135 |
| 5,402,515 | 3/1995 | Vidacovich et al. | 385/135 |

FOREIGN PATENT DOCUMENTS

| | | |
|---|---|---|
| 0 215 668 B1 | 9/1986 | European Pat. Off. |
| 0 505 710 A1 | 9/1992 | European Pat. Off. |
| 2 694 642 | 11/1994 | France . |
| 41 06 171 A1 | 3/1992 | Germany . |
| 42 29 884 A1 | 10/1994 | Germany . |
| 44 05 666 A1 | 8/1995 | Germany . |
| WO91/10927 | 7/1991 | WIPO . |
| WO94/12904 | 6/1994 | WIPO . |
| WO94/23324 | 10/1994 | WIPO . |
| WO95/07486 | 3/1995 | WIPO . |

*Primary Examiner*—John D. Lee
*Attorney, Agent, or Firm*—Hill, Steadman & Simpson

[57] ABSTRACT

In a frame, a cassette module for light waveguides contains a plurality of cassettes swivellable around an axis. Connecting leads or connecting fibers thereof are conducted over a vertically residing guide backplane.

11 Claims, 4 Drawing Sheets

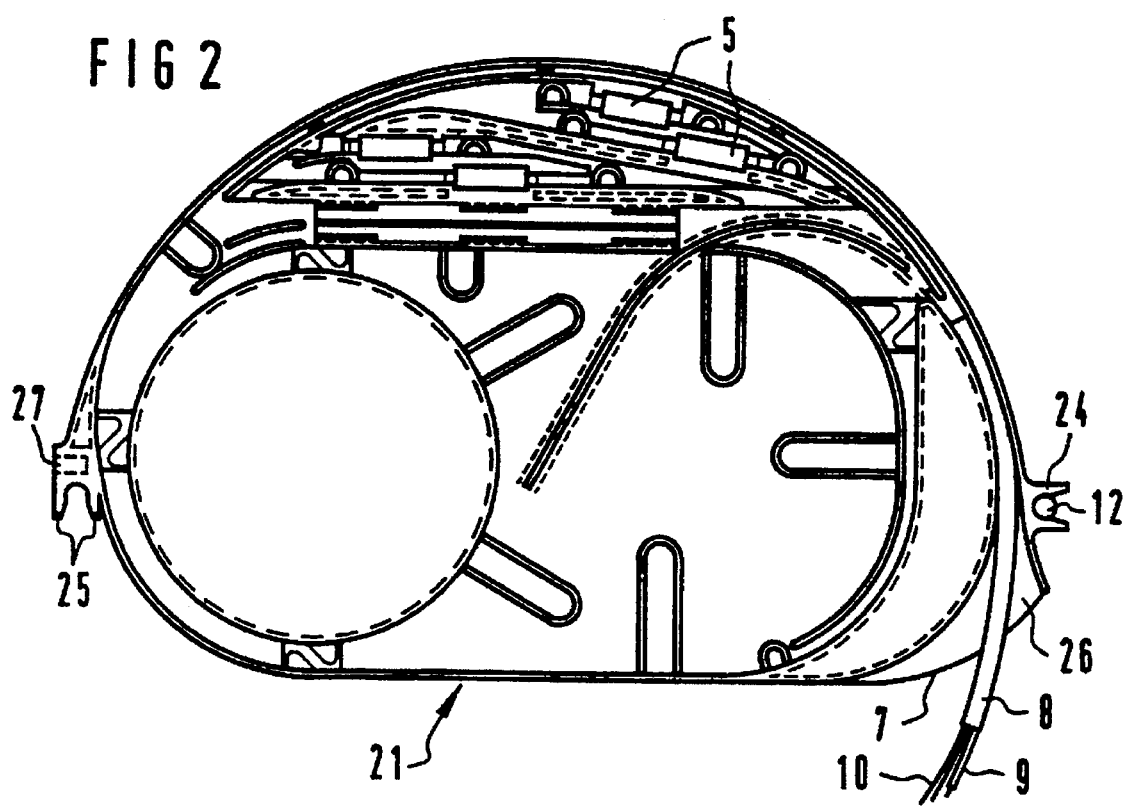
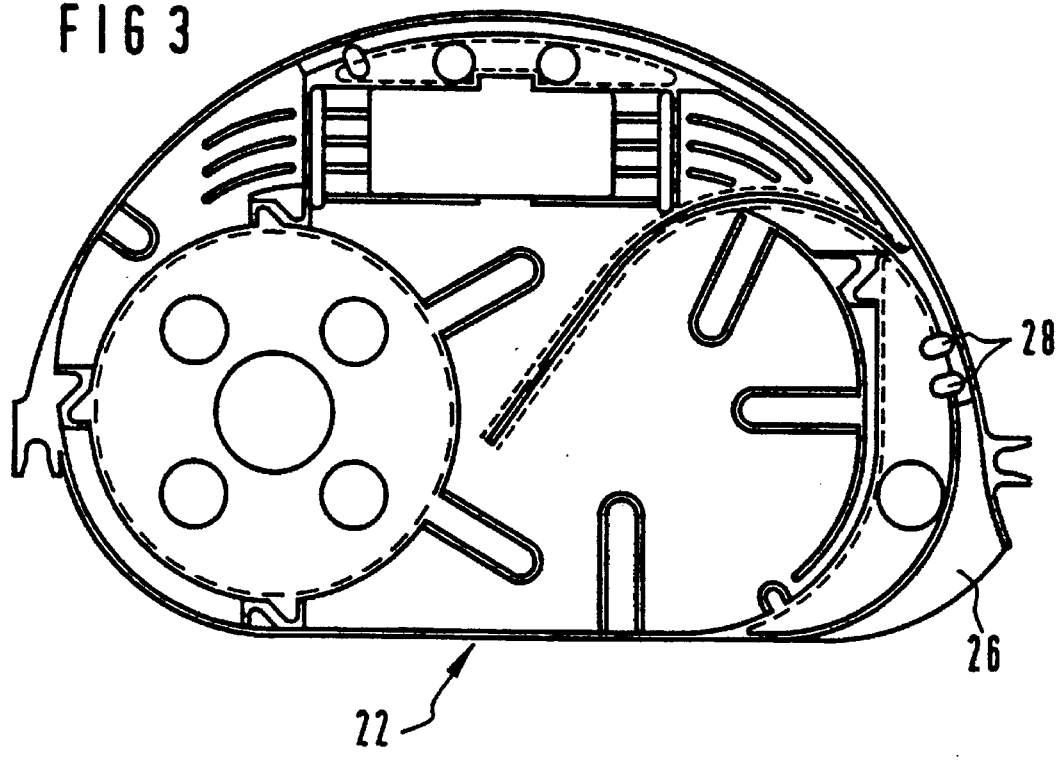

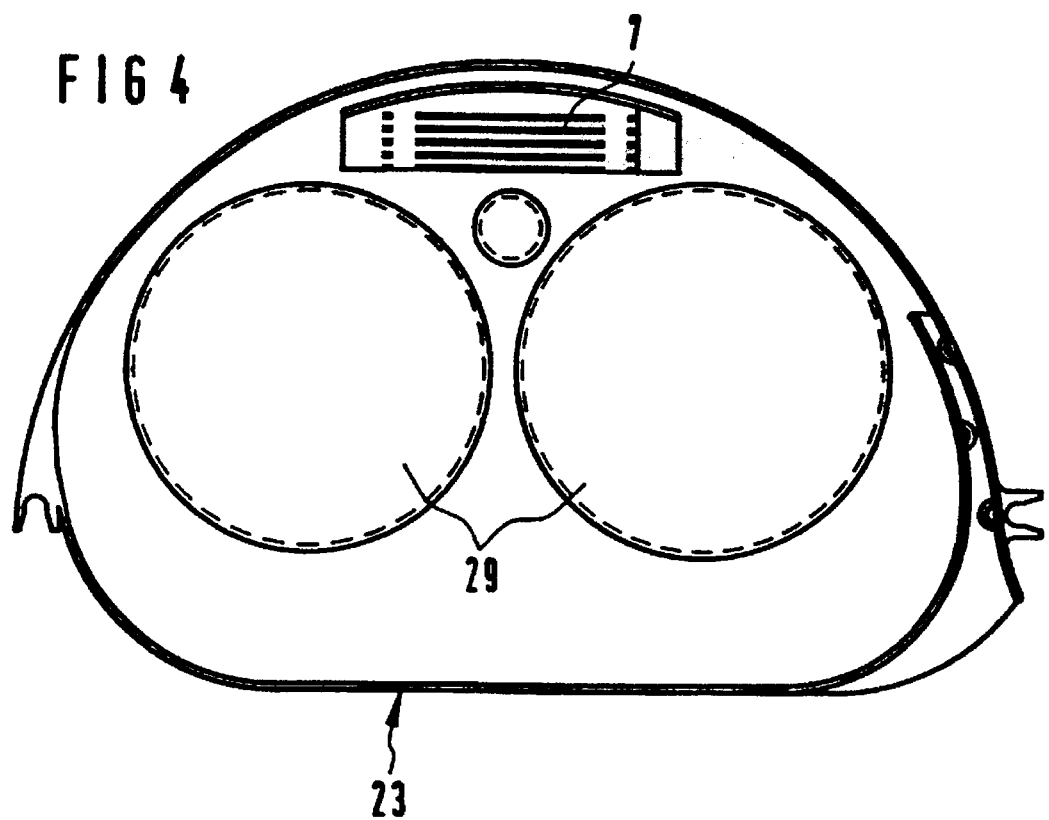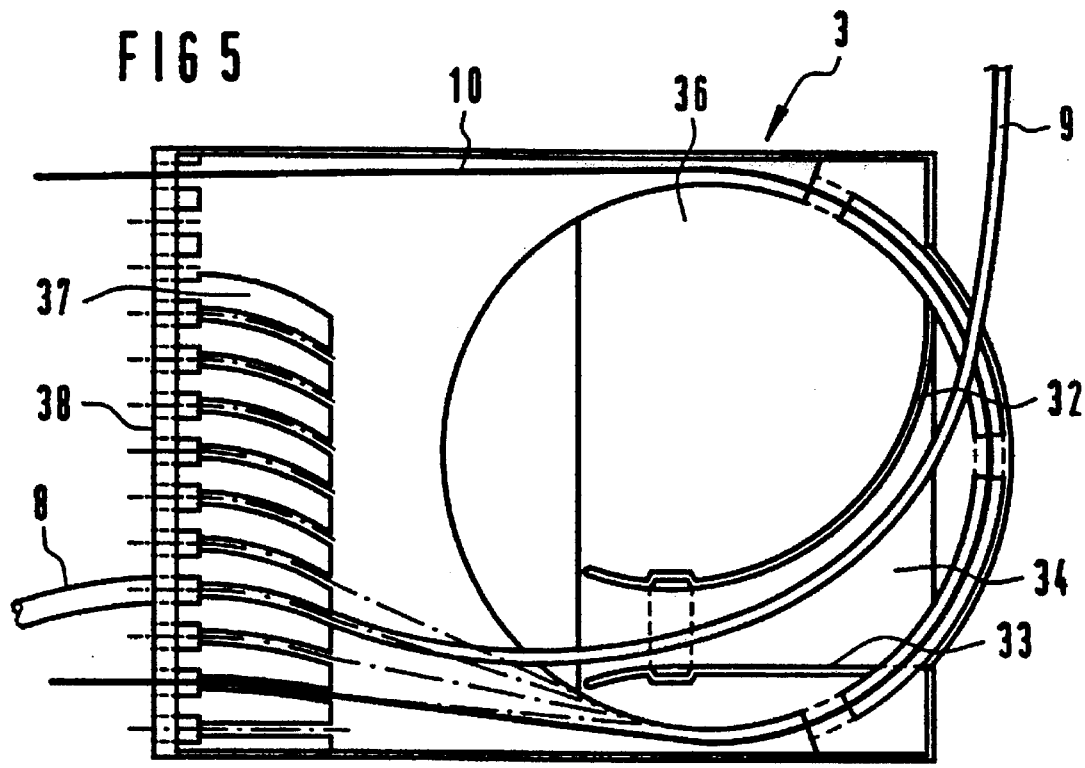

CASSETTE MODULE HAVING SWINGABLE CASSETTES AND A BACKPLANE WITH GUIDE RIDGES FOR GUIDING LIGHT WAVEGUIDES AND OPTICAL FIBERS

BACKGROUND OF THE INVENTION

The invention is directed to a cassette module for light waveguides.

German Published application DE 41 06 171 A1 discloses a cassette block that is composed of cassettes that can be folded open like a book. Openings at the long sides of the cassettes enable a simplified wiring between coupler and splice cassettes. The cassette blocks can be employed both in cabinet-like racks as well as in sleeves.

A different cassette type that is disclosed by German AS 44 05 666 A1, however, is particularly suitable for use in sleeves. This cassette type is matched to the circular cross-section of the sleeve and is employed in a universal connector unit for light waveguides, whereby the cassette can be designed for the acceptance of splices or of couplers in conformity with its intended use. The wiring between the cassettes occurs via wiring elements that are secured as a backplane to an assembly clip. The wiring between the individual cassettes can already be prefabricated, so that only the connecting cable still has to be connected.

The flexibility, however, is restricted by the prefabricated wiring, and subsequent modification is made more difficult.

SUMMARY OF THE INVENTION

An object of the invention is to specify a possibility for the flexible construction of line or connector units.

According to the present invention, a cassette module for light waveguides has a frame provided for acceptance of a plurality of semicircularly designed cassettes. Each cassette is individually swivelable around a swiveling axis. A feed opening for light waveguides is provided at a base of each cassette close to the swiveling axis. A guide backplane is arranged perpendicular to a swiveling plane for the cassettes, the guide backplane having guide ridges for guiding light waveguides or hollow leads.

The employment of cassette modules wherein the wiring between the individual cassettes is already prefabricated is especially advantageous. Assembly at the employment location is significantly facilitated as a result thereof since only the splice connections to the connecting cables—or to other cassette modules given modifications—still have to be produced. For facilitating assembly, either hoses are conducted out via the guide backplane, the optical fibers being introduced thereinto, or there is the possibility of conducting the hollow leads of the connecting cable directly to the splice cassettes via a modification of the guide backplane.

A cassette module can contain either only splice cassettes or splice and coupler cassettes. Different splice cassettes can also be employed as needed. The cassette modules all have the same height, so that they can be unproblematically interchanged.

It is advantageous that the cassettes can be individually swivelled out up to a detent with the assistance of a selection means, and the interior of the cassette is thus completely accessible for service work. The connecting leads or connecting fibers proceed in a guide channel of the swivelled-out cassette and are thus protected against accidental or careless damage.

Dependent on the application, the connecting leads can be conducted vertically or horizontally out of the cassette block. An identical structural height of the cassette modules allows an unproblematical interchange.

A catch mechanism that secures the cassettes in their swivelled-in condition and thereby prevents damage during transport and assembly or mounting is advantageous.

An exemplary embodiment of a cassette module is described with reference to the drawing FIGS.

BRIEF DESCRIPTION OF THE DRAWINGS

FIGS. 2 and 3 are splice cassettes;

FIG. 4 is a coupler cassette;

FIG. 5 is a guide backplane for a cassette module comprising splice and coupler cassettes;

DESCRIPTION OF THE PREFERRED EMBODIMENTS

Figure 1:
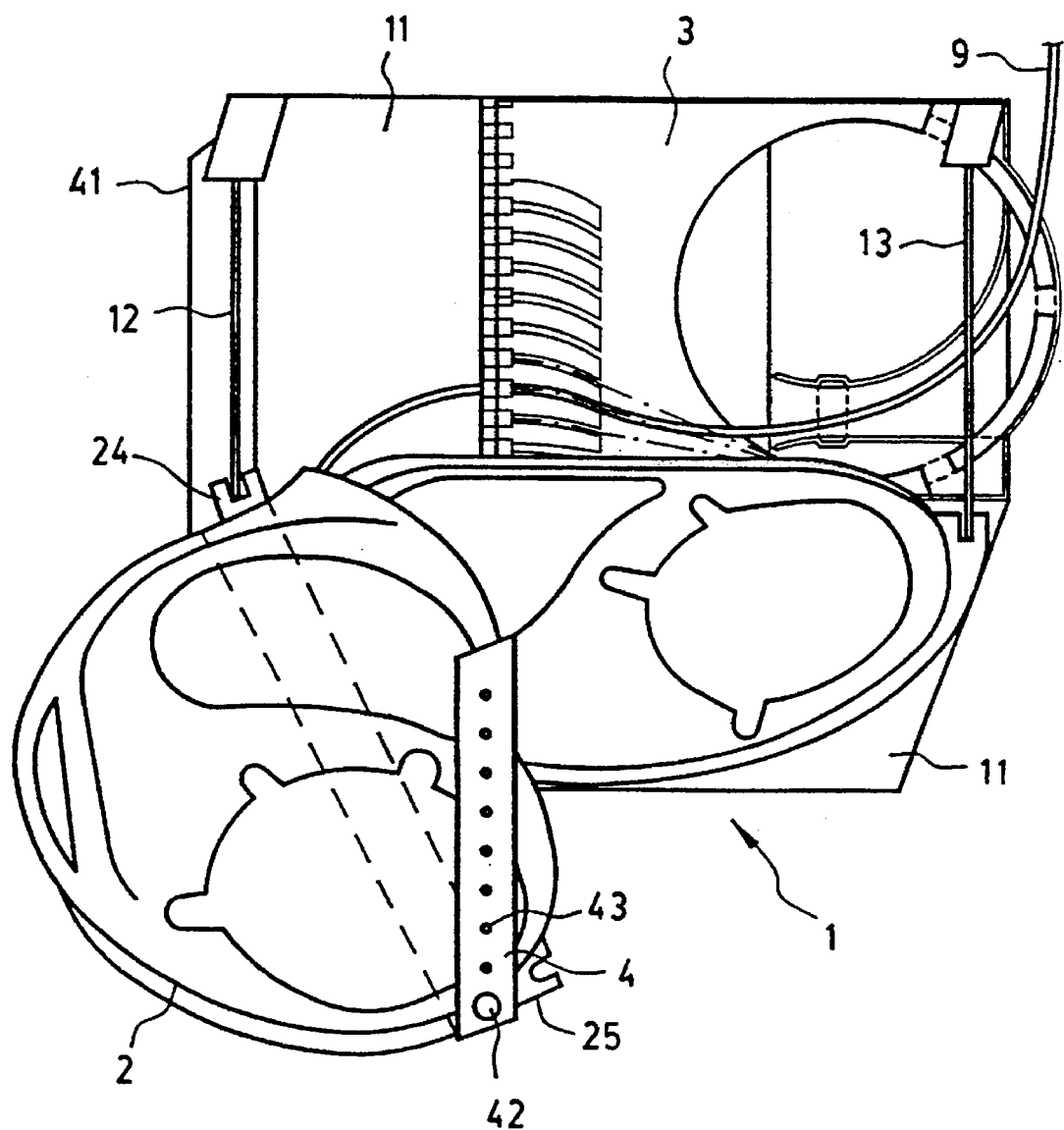
FIG. 1 illustrates a cassette module.

FIG. 1 shows a perspective illustration of a cassette module. The cassette module is composed of a frame 11 into which a plurality of cassettes 2 that are seated in swivellable fashion around an axis 12 (FIG. 2) are inserted lying above one another.

The upper cassettes have been removed in order to show the guide backplane 3. A cassette is swivelled out up to a detent 41 with the assistance of a guide clip 4. The selection of the cassette occurs with a simple clip-shaped selection device that comprises a pin 42 and bores in one leg through which the pin can be conducted into a bore 27 (FIG. 2) in the cassette box. The connection between a coupler cassette and a splice cassette of the same cassette modules occurs with optical fibers via the guide backplane. Hollow lead hoses 9 are also conducted to the splice cassettes via this guide backplane.

Figure 7:
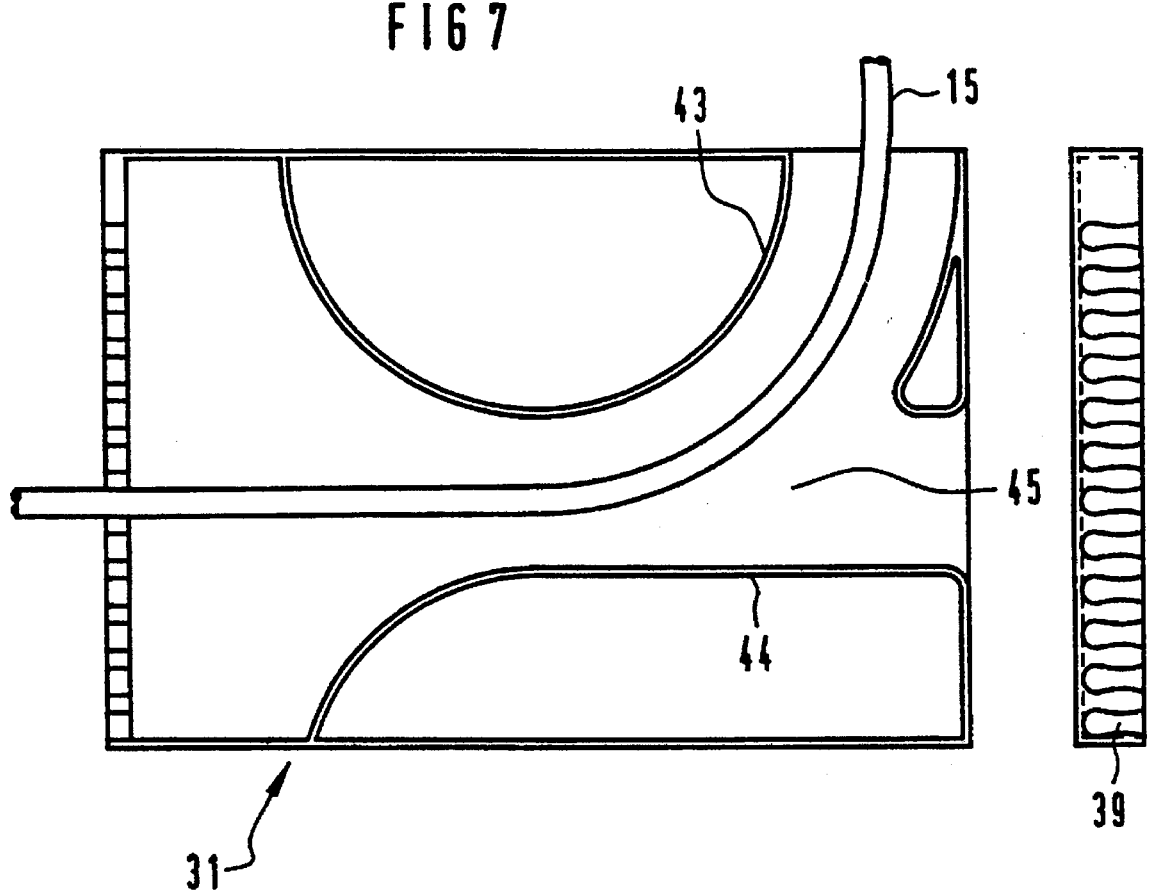
FIG. 7 is a guide backplane for a cassette module comprising only coupler cassettes.

FIG. 2 shows a first exemplary embodiment oft splice cassette 21. In the proximity of the cassette base, the cassette comprises a swivel mount 24 that is slipped onto the axis 12 secured in the frame 11. The cassette can then be swivelled around this axis. The connecting leads, optical fibers 10 or hollow lead hoses 9 (or hollow leads 15; FIG. 7) are conducted to the splices through a feed opening 7 and a guide channel 26; the spliced fibers can also be conducted out through the same guide channel due to the fiber guide in the shape of a figure eight within the cassette.

A hose 8 is provided for protecting the optical fibers and hollow leads.

A catch clamp 25 is arranged at that side of the cassette lying opposite the swivel mount 24; this catch clamp 25 engages at a second axis 13 (FIG. 1) in the swivelled-in condition.

The bore 27 serves the purpose of introducing the pin 42 of the selection device.

Openings can be provided in the cassette floor close to the splices in order to be able to undertake measurements directly at an optical fiber.

FIG. 3 shows a modification of the splice cassette 22 that serves the purpose of accepting eight splices 5 in two layers. A strain relief 28 is provided in the guide channel 26.

FIG. 4 shows a coupler cassette 23 wherein coupler 7 is arranged in the upper part lying opposite the cassette floor. The reserve length can be stored in the shape of a figure eight around two winding members 29.

FIG. 5. shows a guide backplane 3 for a cassette module that contains coupler and splice cassettes. A circular core 36 that forms the inner limitation of a guide groove 31 in the outer region is provided directly on the backplane. The optical fibers 10 that connect the couplers of one cassette to the splices of another cassette are conducted around this core. These can be additionally protected against damage by a cover plate. Hollow lead hoses 9 (or hollow leads) that are introduced into connecting hoses 8 in common with the optical fibers proceed in the upper plane or level. Guide ridges 32 and 33 see to it that the minimally permitted bending radii are not downwardly crossed. Guide ridges 37 for the acceptance of the hollow lead hoses 9 and of the optical fibers, and that end in the connecting hoses 8 guided by bores 38, are provided at the other (left) side of the guide backplane close to the guide channels of the cassettes. The entire guide backplane can be closed by another cover plate.

Figure 6:
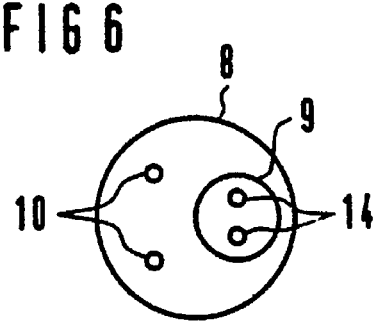
FIG. 6 is a crossectional view of a connecting hose.

FIG. 6 shows a connecting hose in crossection. One can see the hollow lead hose 9 with two light waveguides 14 guided therein as well as the optical fibers 10.

FIG. 7 shows a modification of the guide backplane 31 for a cassette module in which only splice cassettes are arranged. A wiring between the cassettes with optical fibers is omitted in this module. The guide backplane is provided with guide ridges 43 and 44 that insure adherence to the minimum bending radius. The guide channel 45 formed in this way allows both a deflection of hollow leads into the perpendicular as well as their horizontal entry. The guide backplane is suitable for hollow leads that come from the connecting cables and are directly guided up into the splice cassettes through oblong holes in the guide backplane.

Although various minor changes and modifications might be proposed by those skilled in the art, it will be understood that our wish is to include within the claims of the patent warranted hereon all such changes and modifications as reasonably come within our contribution to the art.

We claim as our invention:

1. A cassette module, comprising:
a frame for acceptance of a plurality of semicircularly designed cassettes;
a swiveling axis connected to said frame about which each cassette is individually swivelable;
each cassette having at a base thereof close to said swiveling axis a feed opening for at least one of the elements selected from the group consisting of a hollow lead hose containing light waveguides and optical fibers;
said frame having a guide backplane arranged perpendicular to a swiveling plane of the cassettes, said backplane having guide ridges for guiding said at least one of the elements selected from the group consisting of a hollow lead hose containing light waveguides and optical fibers for the cassettes; and
a guide clip selection device swivelable about said swiveling axis and which swivels out a selected cassette when the selected cassette is connected to said selection device.

2. A cassette module according to claim 1 wherein said feed opening of each cassette receives, encased within a connecting hose, both said hollow lead hose and said optical fibers, and said connecting hose terminating at said guide backplane, and said guide ridges guiding both said hollow lead hose and said optical fibers.

3. A cassette module according to claim 1 wherein one of said guide ridges is formed as a substantially circular segment.

4. A cassette module according to claim 1 wherein said guide backplane has a first set of said guide ridges, one of which is a substantially circular segment, and a second set of guide ridges associated with bores for receiving a connecting hose encircling both said hollow lead hose and said optical fibers, said connecting hose terminating at said guide ridges associated with said bores.

5. A cassette module according to claim 1 wherein said guide clip selection device comprises a vertical guide clip arm having a plurality of apertures therein and wherein a selection pin passing through at least one of the apertures is engageable with a bore of a selected cassette to be swiveled out.

6. A cassette module according to claim 1 wherein each cassette has a swivel mount with an oblong hole which is slipped over said swiveling axis.

7. A cassette module according to claim 6 wherein each cassette has, in addition to said swivel mount, a catch clamp at an opposite side of said cassette from said swivel mount for engaging with an additional axis for locking the cassette in position in a non-swiveled-out position.

8. A cassette module according to claim 1 wherein a detent is provided attached to said guide backplane and adjacent said swiveling axis for limiting an outward swivel position of the cassette modules.

9. A cassette module, comprising:
a plurality of cassettes having a partially flat base portion and an outer partially circular portion opposite to and outwardly of the base portion;
a guide backplane having attached thereto a swiveling axis;
the semicircular cassettes being attached to said swiveling axis for swiveling out away from said guide backplane, said guide backplane being arranged perpendicularly to a plane of rotation of said cassettes;
said guide backplane having guide ridges for guiding and diverting at least one of the elements selected from the group consisting of a hollow lead hose containing light waveguides and optical fibers;
each cassette having only one feed opening arranged adjacent to said swivel axis for receiving said at least one element selected from the group consisting of a hollow lead hose and optical fibers;
said guide backplane and said swivel axis being arranged such that when said cassettes are in a swiveled-in position, the base portions of said cassettes are adjacent said guide backplane; and
said guide ridges guiding said at least one of the elements selected from the group consisting of a hollow lead hose and optical fibers from a position adjacent said swiveling axis at said feed opening of each cassette along said guide backplane first in a direction substantially parallel to said plane of rotation of the cassettes and thereafter in a diverted direction along said guide backplane so that said at least one of the elements selected from the group then ends up running in a direction substantially perpendicular to said plane of rotation and substantially parallel to said swivel axis where it exits from the guide backplane.

10. A cassette module according to claim 9 wherein said guide ridges comprise a first set of guide ridges on said guide backplane receiving said at least one of the elements selected from the group for guiding the at least one element in said substantially parallel direction to said swivel plane and a second set of guide ridges wherein at least one of said second set of guide ridges is substantially circular for guiding the at least one element in a substantially circular guide path parallel to said guide backplane so that said at least one element ends up running in said direction substantially perpendicular to said plane of rotation of said cassettes.

11. A cassette module according to claim 9 if wherein in addition to said guide ridges a circular core is provided which forms an inner limitation of a guide groove which is in addition to a guide groove formed by said guide ridges for guiding optical fibers that connect couplers of one cassette to splices of another cassette, said circular core guiding said optical fibers around an approximately 180° path parallel to said guide backplane.

* * * * *